United States Patent
Yen et al.

(10) Patent No.: US 8,611,564 B1
(45) Date of Patent: Dec. 17, 2013

(54) 3.5 MM AUDIO PLUG WITH BUILT-IN LIGHTING SOURCE

(71) Applicant: Conary Enterprise Co., Ltd., Taipei (TW)

(72) Inventors: Hsien-Cheng Yen, Taipei (TW); Wen-Wei Lin, Taipei (TW)

(73) Assignee: Conary Enterprise Co., Ltd., Taipei (TW)

( * ) Notice: Subject to any disclaimer, the term of this patent is extended or adjusted under 35 U.S.C. 154(b) by 0 days.

(21) Appl. No.: 13/656,779

(22) Filed: Oct. 22, 2012

(30) Foreign Application Priority Data

Jun. 5, 2012 (TW) .............................. 101210820 A (51) Int. Cl.
*G09F 27/00* (2006.01)
*H04R 1/10* (2006.01)
*H04R 25/00* (2006.01)
*H04R 1/02* (2006.01)

(52) U.S. Cl.
USPC .............. 381/124; 381/74; 381/184; 381/394

(58) Field of Classification Search
USPC ......... 381/74, 124, 150, 184, 394; 362/23.01, 362/23.07, 88, 109; 439/668
See application file for complete search history.

(56) References Cited

U.S. PATENT DOCUMENTS

| | | | | |
|---|---|---|---|---|
| 6,341,871 B1 * | 1/2002 | Angelopoulos | .................. | 362/23 |
| 6,755,549 B2 * | 6/2004 | Rogers et al. | .................... | 362/88 |
| 7,086,748 B1 * | 8/2006 | Elembaby | ........................ | 362/88 |
| 7,601,032 B2 * | 10/2009 | Labarca et al. | ............... | 439/668 |
| 7,857,225 B2 * | 12/2010 | Challa et al. | ............. | 235/462.45 |
| 2006/0014564 A1 * | 1/2006 | Kung | ............................ | 455/557 |

* cited by examiner

*Primary Examiner* — Duc Nguyen
*Assistant Examiner* — Matthew Eason
(74) *Attorney, Agent, or Firm* — Rosenberg, Klein & Lee (57) ABSTRACT

The invention relates to a 3.5 mm audio plug with built-in light source, particularly to a light-emitting element arranged in a hollow tube and two conductive portions and several insulating portions arranged on a predetermined position of a surface of the audio plug for acquiring power and supplying the power to the light-emitting element in order to form a laser pen. At the same time, the electronic products are able to maintain normal output sound from a speaker when the audio plug is inserted into the audio jack of the predetermined electronic product, avoiding missed calls. Moreover, the audio plug is arranged in the audio jack except the light-emitting hole; that is, the present invention is nearly integrated with the smartphone 70, which is not only beautiful but easy to carry.

7 Claims, 7 Drawing Sheets

3.5 MM AUDIO PLUG WITH BUILT-IN LIGHTING SOURCE

BACKGROUND OF THE INVENTION

1. Field of the Invention

The invention relates to a 3.5 mm audio plug with built-in lighting source, particularly to a built-in light-emitting element with only light-emitting hole exposed out of an audio jack for saving space and easily carrying.

2. Description of the Related Art

With the rapid development of computer and communications technology, electronic products have become increasingly popular; especially mobile phones have become one of the essential devices of modern people. At the same time, the industry continues to introduce new mobile phones with various functions for enhancing the convenience and practicality of mobile phones. For example, smart phones have become the market mainstream, and the all-inclusive applications won the love of consumers.

Laser pens are required for business people and teachers while making a presentation or teaching. However, some laser pens need a mouse or adjust key for projection function so that it is inconvenience to carry all the things for a presentation or teaching.

Figure 1A:
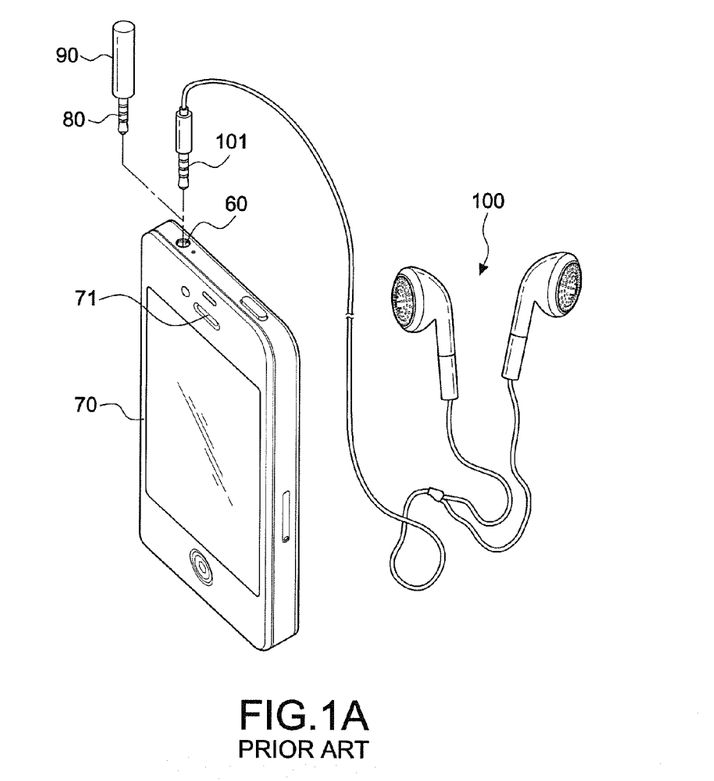
FIG. 1A is a schematic view of a conventional laser pen and mobile phone.
Figure 1B:
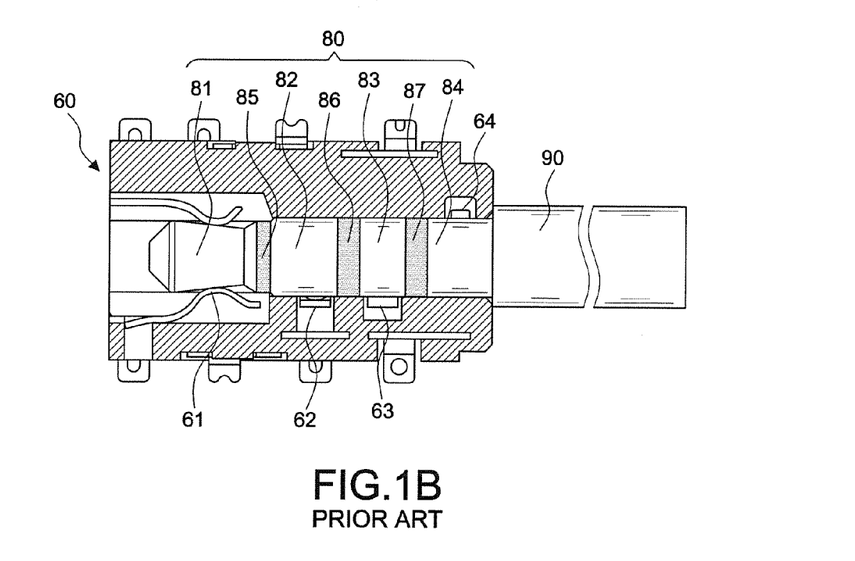
FIG. 1B is a sectional view of a conventional laser pen and audio jack.

With the references to FIGS. 1A and 1B, a multifunction laser pen 90 can be inserted into an audio jack 60 of a mobile phone 70. However, the laser pen 90 is exposed out of the audio jack 60 at least 4 to 5 cm when using the conventional laser pen 90; hence, it is inconvenient to carry and requires more space for storing. Moreover, when inserting the conventional laser pen 90 into the audio jack 60, a plug 80 is separated into a first conductive portion 81, a second conductive portion 82, a third conductive portion 83 and a fourth conductive portion 84 by a first insulating layer 85, a second insulating layer 86 and a third insulating layer 87 and the first, second, third and fourth conductive portion 81, 82, 83, 84 are electronically connected to a first terminal 61, a second terminal 62, a third terminal 63 and a fourth terminal 64 in a inserted hole 60; such that, a sound of the mobile phone 70 cannot be outputted by a speaker 71. Therefore, there is room for improvement.

SUMMARY OF THE INVENTION

It is a primary object of the present invention to provide a 3.5 mm audio plug with built-in light source having a light-emitting element in an audio jack and a light-emitting hole out of the audio jack, saving spacing and being easy to carry.

It is another object of the present invention to provide a 3.5 mm audio plug with built-in light source without affecting the normal sound output of electronic products, avoiding missed calls and impact of normal use of electronic products.

In order to achieve the above objects, the 3.5 mm audio plug with built-in light source, particularly to an audio plug matching the standard size specification of a 3.5 mm audio jack for acquiring power from the audio jack and supplying the power to an built-in light-emitting element and the audio plug, comprising: a hollow tube, a light-emitting element, an optical lens, a head, a cover body.

The hollow tube made of conductive materials has a first conductive portion at a front section thereof, a first insulating portion at a rear section thereof and a 3.5 mm outer diameter. The light-emitting element includes a base board, a light-emitting portion on the base board and a pin on a bottom surface of the base board and the above components are modular for the light-emitting element to be fully inserted into the hollow tube. The optical lens within the hollow tube is located in a front of the light-emitting portion of the light-emitting element. The head being a cone body at a front end has a joint portion at a rear end thereof for inserting into a front opening of the hollow tube. The head being out of a front end of the hollow tube matches the standard size specification of a 3.5 mm audio plug, the cone body has at least a part thereof forming a second conductive portion and at least a section of the joint portion forming a second insulating portion for isolating the cone body and the first conductive portion The second conductive portion is electronically connected to the pin of the light-emitting element and the cover body is fixed on an outer side of a rear opening of the hollow tube.

Whereby when the audio plug is inserted into the 3.5 mm audio jack of a predetermined electronic product, the first conductive portion and the second conductive portion are respectively electronically connected to a second terminal and a first terminal arranged at a predetermined position in the audio jack for acquiring power and supplying the power to the light-emitting element; simultaneously, the first insulating portion is connected to terminals other than the second terminal and the first terminal in the audio jack for avoiding a sound outputting from the audio jack.

Based on the features disclosed, the light-emitting element includes a laser diode or a light emitting diode. The second insulating portion is composed of rubber or plastic, the outer diameter thereof cannot exceed 3.5 mm or equal 3.5 mm and the inner part thereof is provided for mounting the optical lens. The second insulating portion and the optical lens can be integrally injection molded or assembled after separately molded.

Moreover, the cone body includes insulations at an upper and lower surface thereof and a gap is arranged between the insulations for the second conductive portion being a tabular body to be fixed in the gap. The cover body can be set into a predetermined type body according to the requirements and having a C-clamp at a side thereof. The electronic product includes a smart phone with built-in applications.

Based on the features disclosed, a laser pen or a light pen formed by the 3.5 mm audio plug of the present invention is integrated with mobile phones and other electronic products as a whole, achieving easy-carry and easy-use effects. Besides, the present invention can make use of the application of electronic products as a virtual mouse.

DETAILED DESCRIPTION OF THE PREFERRED EMBODIMENT

Referring to FIGS. 2 through 7, the preferred embodiment of a 3.5 mm audio plug with built-in light source in accordance with the present invention comprises: an audio plug 50 and a 3.5 mm audio jack 60 of a predetermined electronic product for inserting the audio plug 50. In this embodiment, the predetermined electronic product is a smartphone 70 which is an example but not a limitation. The audio plug 50 comprises a hollow tube 10, a light-emitting element 20, an optical lens 24, a head 30 and a cover body 40.

Figure 2:
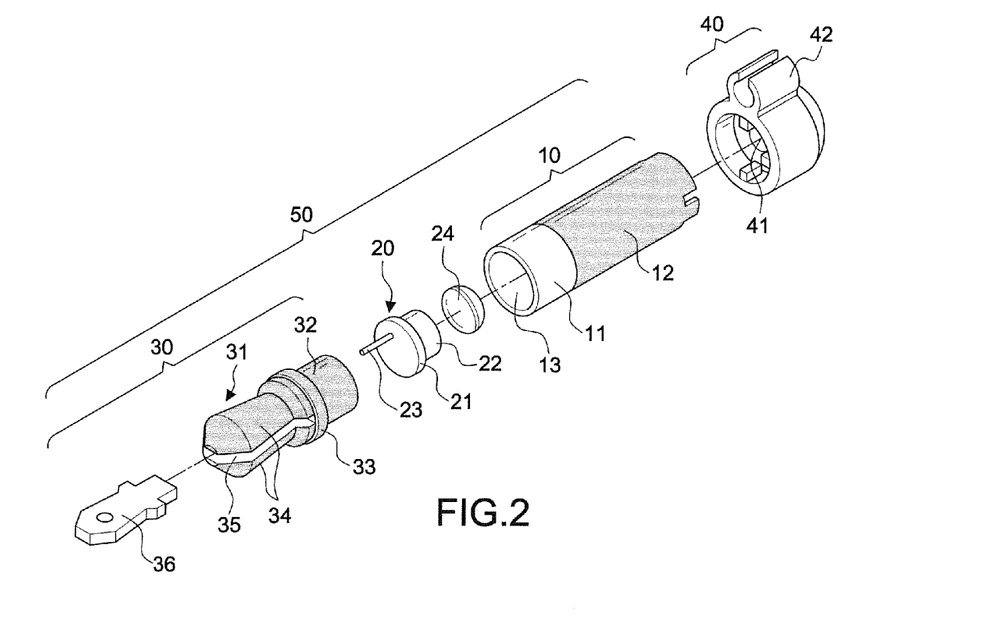
FIG. 2 is an explored perspective view of the present invention.
Figure 3:
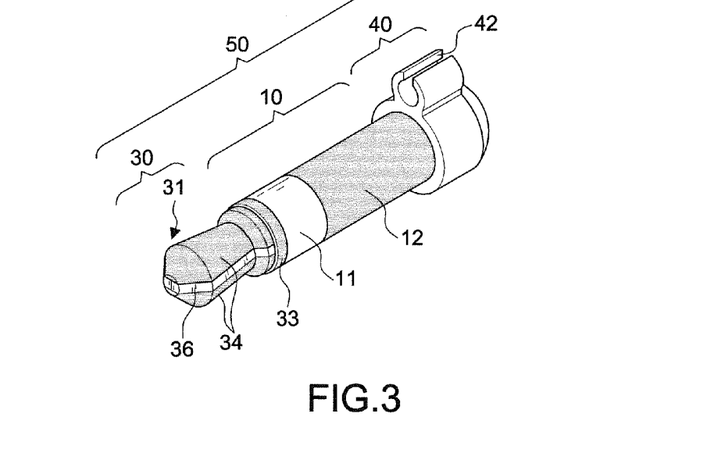
FIG. 3 is an assembled perspective view of the present invention.

With the references to FIGS. 2 and 3, the hollow tube 10 made of conductive materials includes a first conductive portion 11 at a front section thereof, a first insulating portion 12 at a rear section thereof. In the embodiment, the second insulating portion 12 is composed of rubber or plastic and an outer diameter thereof cannot exceed 3.5 mm or equal 3.5 mm.

With the references to FIGS. 2 and 3, the light-emitting element 20 includes a base board 21, a light-emitting portion 22 on the base board 21 and a pin 23 on a bottom surface of the base board 21 and the above components are modular for the light-emitting element 20 to be fully inserted into the hollow tube 10. In the embodiment, the light-emitting element 20 includes a laser diode or a light emitting diode and the base board 21 of the light-emitting element 20 is electronically connected to the first conductive portion 11 of the hollow tube 10. Moreover, the optical lens 24 within the first insulating portion 12 of the hollow tube 10 located in a front of the light-emitting portion 22 of the light-emitting element 20.

With the references to FIGS. 2 and 3, the head 30 being a cone body 31 at a front end has a joint portion 32 at a rear end thereof for inserting into a front opening 13 of the hollow tube 10 and the head 30 being out of a front end of the hollow tube 10 matches the standard size specification of a 3.5 mm audio plug. Moreover, the cone body 31 has at least a part thereof forming a second conductive portion 36 and at least a section of the joint portion 32 forming a second insulating portion 33 for isolating the cone body 31 and the first conductive portion 11. The cone body 31 may be made of insulating materials or may include insulations 34 at an upper and lower surface thereof and a second conductive portion 36 is arranged between the insulations 34. Besides, the second conductive portion 36 is electronically connected to the pin 23 of the light-emitting element 20. In this embodiment, a gap 35 is arranged between the insulations 34 of the head 30 and the second conductive portion 36 being a tabular body is fixed in the gap 35, which is an example but not a limitation.

The cover body 40 is fixed on an outer side of a rear opening 14 of the hollow tube 10 and includes a light-emitting hole 41. In this embodiment, the cover body 40 may be set into a predetermined type body according to the requirements and may have a C-clamp 42 at a side thereof, such that the audio plug 50 can be clamped on the headphone cable shown in FIG. 1A by the C-clamp 42.

Whereby when the audio plug 50 is inserted into the 3.5 mm audio jack 60 of a predetermined electronic product, the first conductive portion 11 and the second conductive portion 36 are respectively electronically connected to a second terminal 62 and a first terminal 61 arranged at a predetermined position in the audio jack 60 for acquiring power and supplying the power to the light-emitting element 20. In this embodiment, a third terminal 63 and a fourth terminal 64 are electronically connected to the insulations 34 so that a sound is not output from the audio jack 60 but from a speaker 71 of the smartphone 70.

Figure 4:
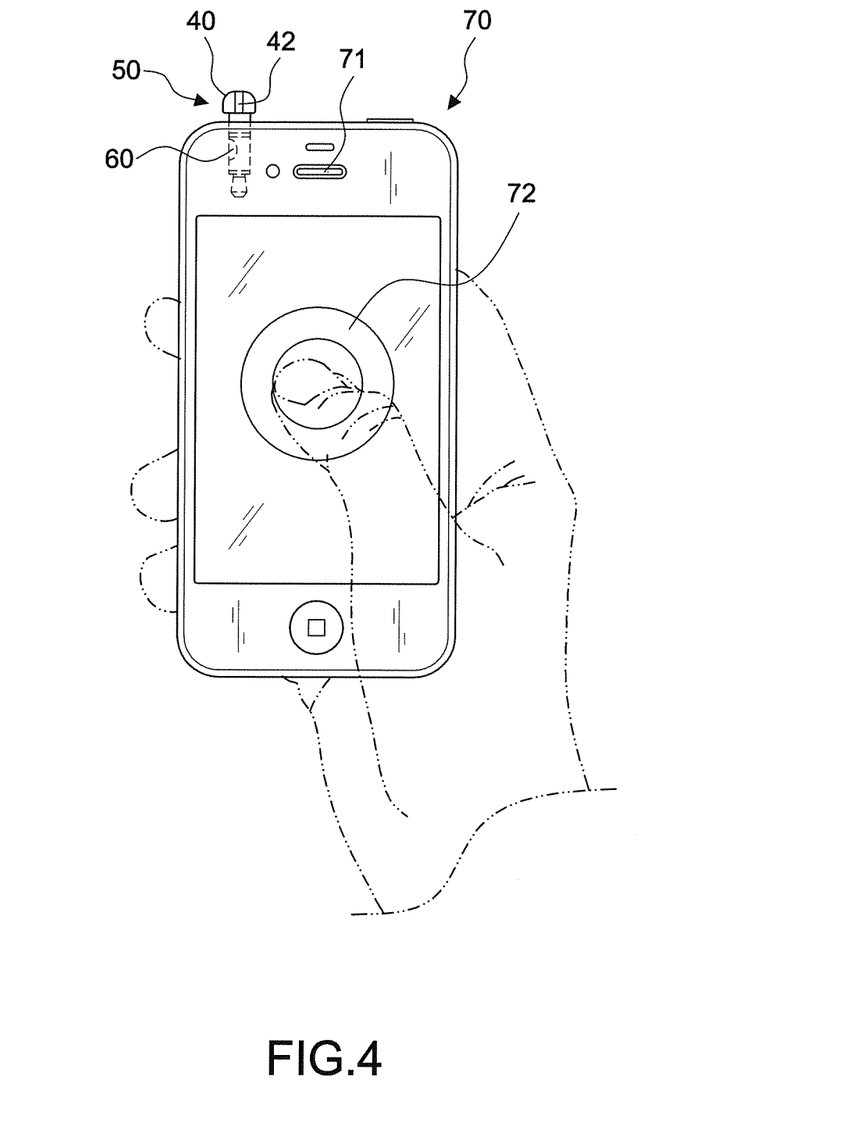
FIG. 4 is a front elevational view of the present invention inserted into an audio jack.
Figure 5A:
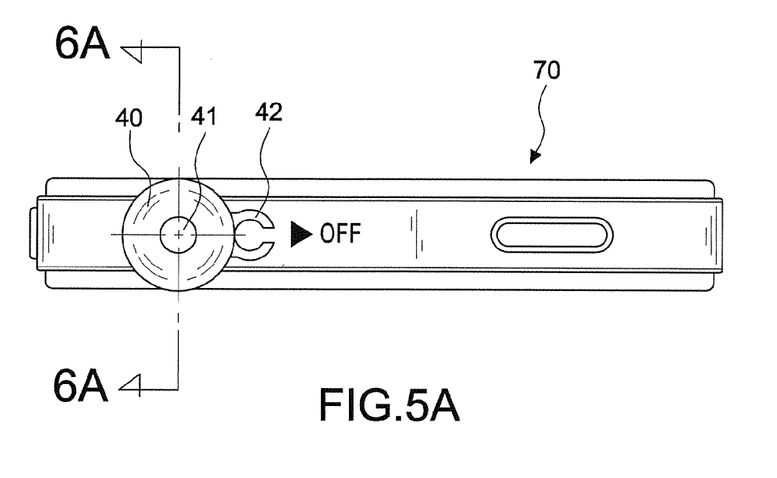
FIG. 5A is a top plan view of the present invention inserted into an audio jack, illustrating in a non-conductive state.
Figure 5B:
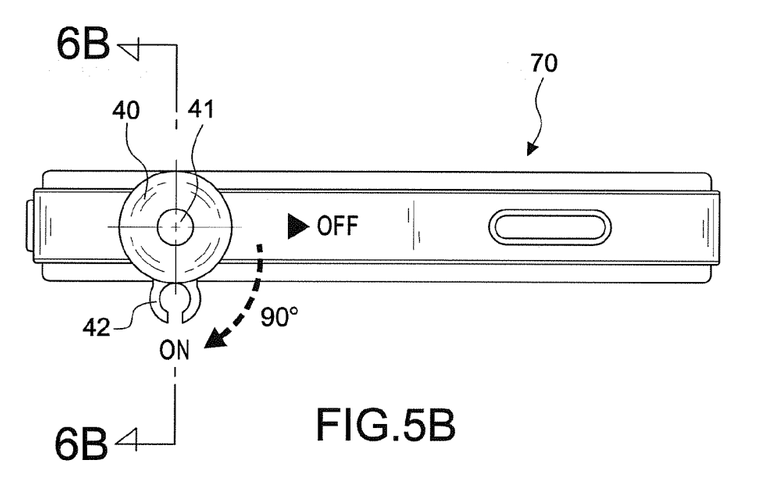
FIG. 5B is a top plan view of the present invention inserted into an audio jack, illustrating in a conductive state.
Figure 6A:
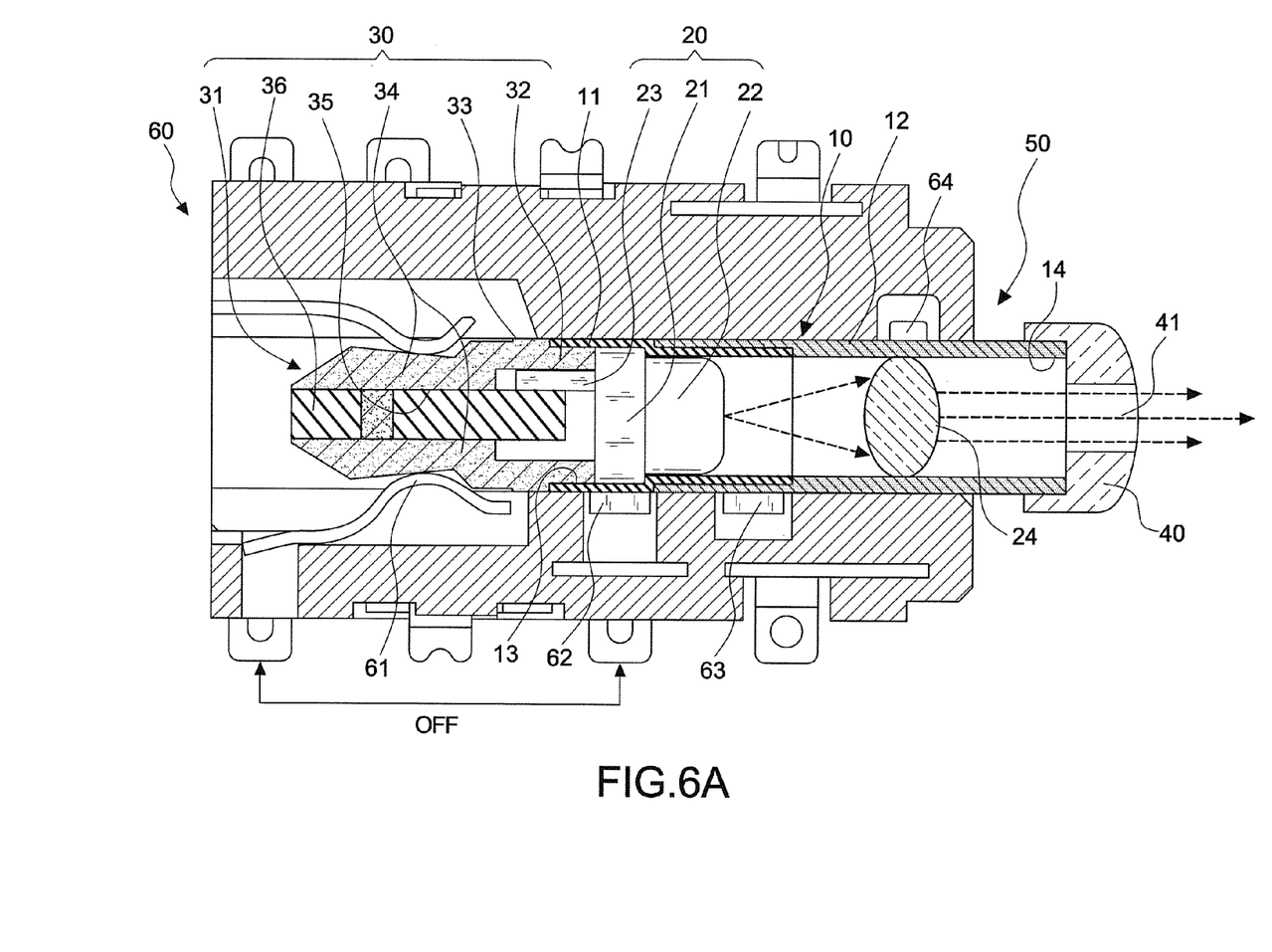
FIG. 6A is a cross-sectional view taken along the line 6A-6A in FIG. 5A.
Figure 6B:
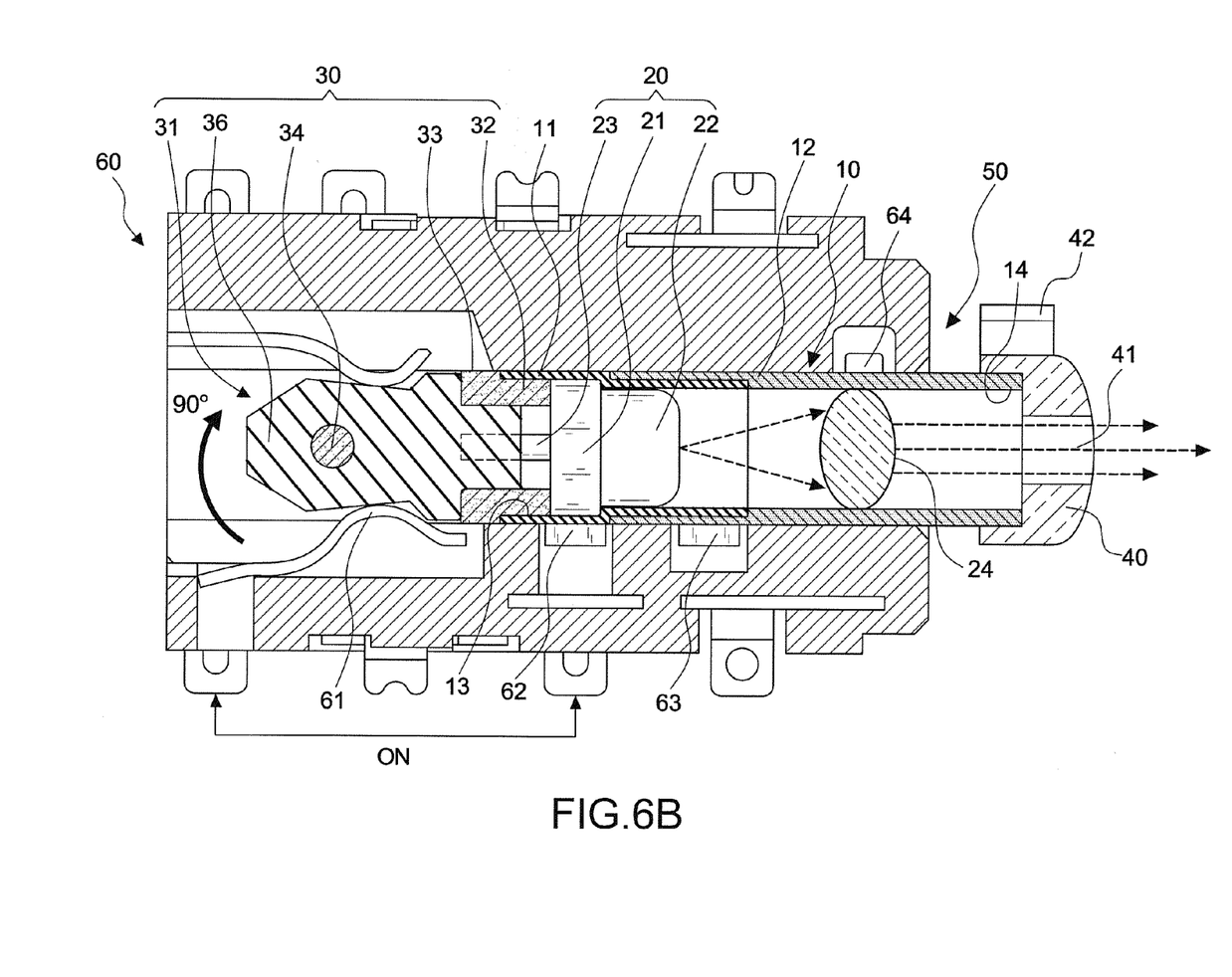
FIG. 6B is a cross-sectional view taken along the line 5B-5B in FIG. 5B.

With the reference to FIG. 4, the present invention can be operated by a touch point 72 of the smartphone 70 with a built-in application. However, the built-in application of the smartphone is a prior art and thus will not be described in details here.

Based on the features disclosed, the present invention has following effects:

1. The present invention provides the audio plug 50 to match the standard size specification of the 3.5 mm audio jack 60 of electronic products and the audio plug 50 is arranged in the audio jack 60 except the light-emitting hole 41 of the cover body 40; that is, the present invention is nearly integrated with the smartphone 70, which is not only beautiful but easy to carry and use.

2. With the references to FIGS. 5A and 6A, the audio plug 50 is in an OFF state; that is, the first terminal 61 of the audio jack 60 is connected to the insulation 34 of the audio plug 50 and the third and fourth terminal 63, 64 are connected to the second insulating portion 12. Therefore, even though the audio plug 50 is set in the audio jack 60, the sound of the smartphone 70 will not be output from the audio jack 60 but from the speaker 71, which does not affect the normal use of the smartphone 70.

Figure 7:
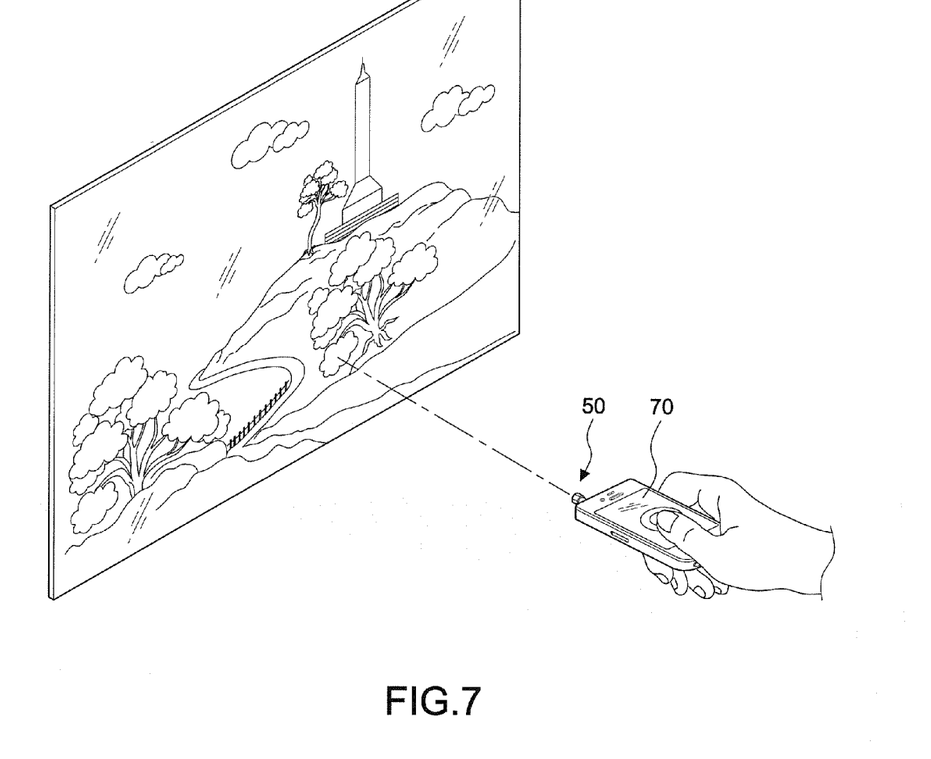
FIG. 7 is an application example of the present invention.

3. With the references to FIGS. 5B and 6B, the audio plug 50 is in an ON state when the audio plug 50 is rotated 90°; that is, the first conductive portion 11 and the second conductive portion 36 are respectively electronically connected to the second terminal 62 and the first terminal 61. Therefore, the pin 23 of the light-emitting element 20 acquires power and a light diode (LD) or light-emitting diode (LED) of the light-emitting portion is driven by the power and emits light to form a laser pen or light-emitting pen as shown in FIG. 7 for making a presentation or teaching.

Consequently, the present invention discloses the audio plug 50 matching the existing 3.5 mm audio jack 60 of the electronic products to hide the LD or LED in the headphone jack and further solve the drawbacks of the conventional external laser pen.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A 3.5 mm audio plug with built-in light source, particularly to an audio plug matching the standard size specification of a 3.5 mm audio jack for acquiring power from the audio jack and supplying the power to an built-in light-emitting element and the audio plug, comprising:

a hollow tube made of conductive materials and having a first conductive portion at a front section thereof, a first insulating portion at a rear section thereof and a 3.5 mm outer diameter;

a light-emitting element having a base board, a light-emitting portion on the base board and a pin on a bottom surface of the base board and the above components being modular for the light-emitting element to be fully inserted into the hollow tube;

an optical lens within the hollow tube located in a front of the light-emitting portion of the light-emitting element;

a head being a cone body at a front end and having a joint portion at a rear end thereof for inserting into a front opening of the hollow tube, the head being out of a front end of the hollow tube matching the standard size specification of a 3.5 mm audio plug, the cone body having at least a part thereof forming a second conductive portion and at least a section of the joint portion forming a second insulating portion for isolating the cone body and the first conductive portion and the second conductive portion being electronically connected to the pin of the light-emitting element; and a cover body fixed on an outer side of a rear opening of the hollow tube;

whereby when the audio plug is inserted into the 3.5 mm audio jack of a predetermined electronic product, the first conductive portion and the second conductive portion are respectively electronically connected to a second terminal and a first terminal arranged at a predetermined position in the audio jack for acquiring power and supplying the power to the light-emitting element; simultaneously, the first insulating portion is connected to terminals other than the second terminal and the first terminal in the audio jack for avoiding a sound outputting from the audio jack.

2. The 3.5 mm audio plug with built-in light source as claimed in claim 1, wherein the light-emitting element includes a laser diode or a light emitting diode.

3. The 3.5 mm audio plug with built-in light source as claimed in claim 1, wherein the second insulating portion is composed of rubber or plastic, the outer diameter thereof cannot exceed 3.5 mm or equal 3.5 mm and the inner part thereof is provided for mounting the optical lens.

4. The 3.5 mm audio plug with built-in light source as claimed in claim 3, wherein the second insulating portion and the optical lens can be integrally injection molded or assembled after separately molded.

5. The 3.5 mm audio plug with built-in light source as claimed in claim 1, wherein the cone body includes an insulation at an upper and lower surface thereof and a gap is arranged between the insulations for the second conductive portion being a tabular body to be fixed in the gap.

6. The 3.5 mm audio plug with built-in light source as claimed in claim 1, wherein the cover body can be set into a predetermined type body according to the requirements and having a C-clamp at a side thereof.

7. The 3.5 mm audio plug with built-in light source as claimed in claim 1, wherein the electronic product includes a smart phone with built-in applications.

* * * * *